United States Patent

Sheehan et al.

[15] 3,665,688
[45] May 30, 1972

[54] HARVESTER AND CONNECTOR FOR HEADER

[72] Inventors: Ronald T. Sheehan, Lancaster; Everett C. Cowan, Parksburg; Myles Hyman, Lancaster, all of Pa.

[73] Assignee: Sperry Rand Corporation, New Holland, Pa.

[22] Filed: May 28, 1971

[21] Appl. No.: 147,935

[52] U.S. Cl. .............................. 56/14.6, 56/15.6, 56/DIG. 9
[51] Int. Cl. .......................................................A01d 35/12
[58] Field of Search ...................... 56/14.5, 14.6, 15.6, 15.9, 56/DIG. 9, 14.9

[56] References Cited

UNITED STATES PATENTS 3,479,804  11/1969  De Paun et al.....................56/15.6 UX

*Primary Examiner*—Louis G. Mancene
*Assistant Examiner*—J. A. Oliff
*Attorney*—C. Hercus Just, Joseph A. Brown, John C. Thompson, James J. Kennedy, George C. Bower and Larry L. Coats

[57] ABSTRACT

An agricultural harvester adapted to have a crop header and feeder housing unit connected thereto is provided with connector mechanism attached to the forward end of the harvester and includes clevises on the inlet end thereof to receive trunnions on opposite sides of the delivery end of the feeder housing. The legs of a hoisting yoke are pivotally connected to the harvester and the outer end of said yoke has upwardly opening seats to engage the lower ends of seating brackets on said feeder housing which, when the hoisting yoke is raised, elevate the outer end of said header and feeder housing in a manner to force the trunnions generally horizontally into full home position within said clevises for the connection of locking means which maintain said trunnions within said clevises.

7 Claims, 3 Drawing Figures

Patented May 30, 1972

INVENTORS
EVERETT C. COWAN
MYLES HYMAN
RONALD T. SHEEHAN,

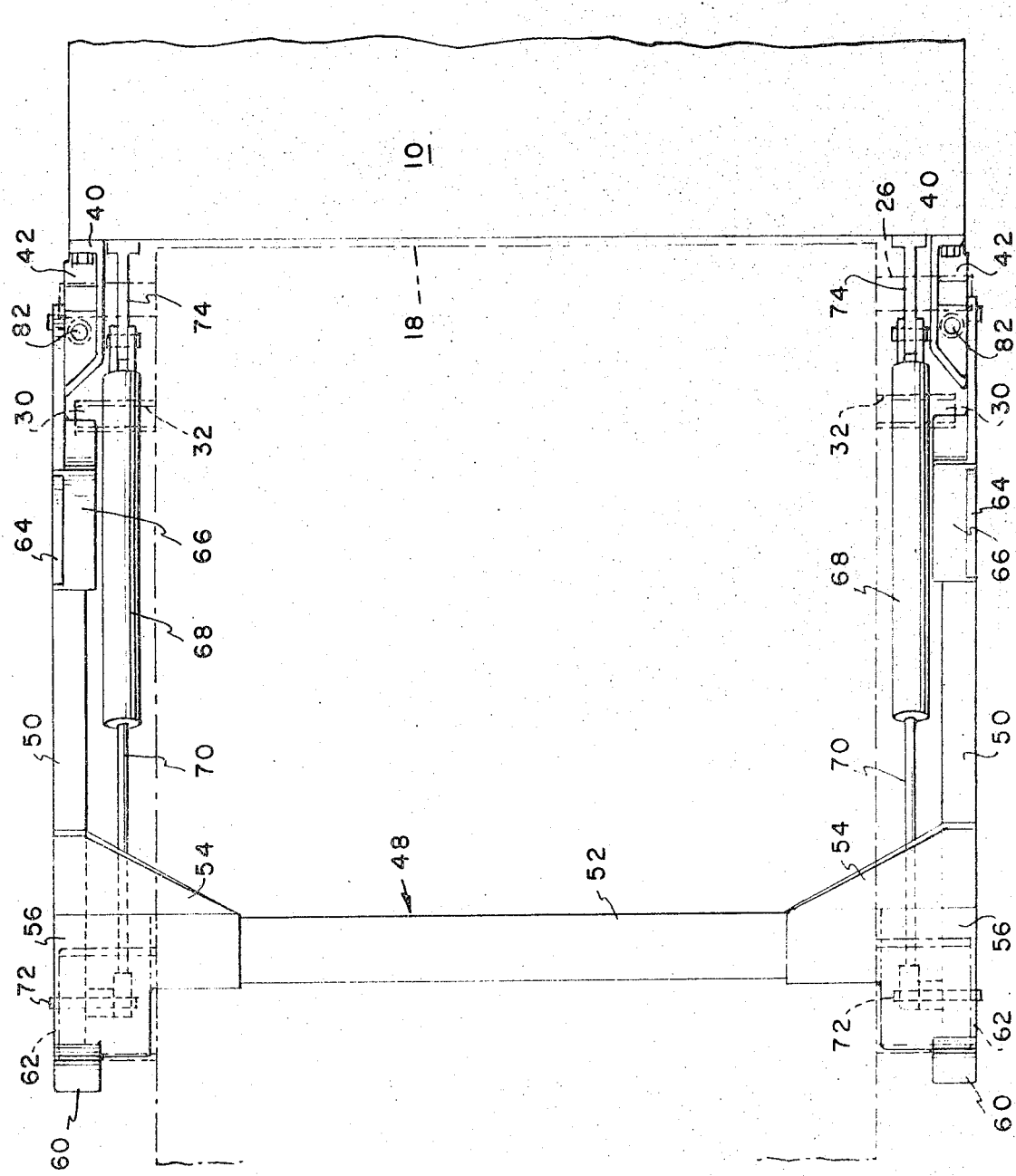

HARVESTER AND CONNECTOR FOR HEADER

BACKGROUND OF THE INVENTION

The current tendency in agricultural implements at present is to construct them so that they are as versatile as possible. This is because the manufacturing costs of such implements is relatively high, especially self-propelled power implements and machines. One type of machine in this category comprises devices known as combines which move along a field and harvest various types of crops, especially grain crops, the combines also including means to thresh the grain and discharge the chaff and straw upon the ground while retaining the threshed grain. The cost of machines of this type is relatively high, whereby means have been sought to render the same sufficiently versatile to harvest a number of different kinds of crops.

When a combine of the type referred to is arranged to harvest grain crops, it normally has a grain platform or header and feeder housing connected to the forward end of the combine to cut the stalks of grain, elevate the same into the combine, through the feeder housing, for the threshing of the grain in the manner referred to above. However, in order to render combines of this type capable of handling other crops, such as corn, it is necessary to use a crop-gathering header adapted to harvest corn and operable to remove the ears from the stalks, and elevate the ears into the combine through the associated feeder housing.

Crop-gathering headers and feeding housings of the type referred to above are relatively heavy types of equipment, whereby connecting and supporting mechanism upon the harvester which engages and supports such crop-gathering header and feeder housing must be of rugged, heavy-duty type. However, in view of the weight of headers and feeder housing, it is difficult to depend upon manual labor to effect such connection and disconnection of the header and feeder housing relative to the harvester. Accordingly, power-operated equipment which is combined with the harvester is desirable.

Certain types of mechanism for connecting crop-gathering headers and feeder housings to agricultural harvesters, such as combines, have been developed heretofore. One such example is illustrated in U.S. Pat. No. 3,479,804, issued Nov. 25, 1969. Said mechanism is more complex than is believed to be necessary.

It is the purpose of the present invention to provide connecting mechanism by which a crop-gathering header and feeder housing may be connected to and disconnected from the forward end of an agricultural harvester, such as a combine, by power-operated means, the overall arrangement being more simple and easier to operate than devices employed heretofore. Details of such improved device are described hereinafter.

SUMMARY OF THE INVENTION

It is the principal object of the present invention to provide a harvester having an inlet in the forward end thereof with connector mechanism by which a crop header and feeder housing may be detachably connected to said forward end of the harvester by the use of trunnions on opposite sides of the feeder housing which are received in bearing clevises connected to the harvester adjacent opposite sides of the inlet means in the forward end thereof, a hoisting yoke having legs pivotally connected at one end of the harvester below the bearing clevises and the opposite ends having upwardly opening seats to receive seating brackets projecting downwardly from the feeder housing, actuating means for the yoke being operable to elevate said seats into engagement with the seating brackets in order to raise the crop header and feeder housing in a manner to cause the trunnions to be seated fully in home position within the inner ends of clevises, and locking means which engage the trunnions to retain the same in the clevises.

It is another object of the invention to provide laterally extending guide means on the feeder housing and guide shoes on the legs of the hoisting yoke which serve to guide the trunnions into the clevises while maintaining the trunnions out of contact with the legs of the hoisting yoke, thereby simplifying the connecting function by which the trunnions are received in the clevises and assuring direct guiding of the trunnions into said clevises.

It is a further object of the invention to provide in the clevises upper and lower substantially horizontal surfaces which guide the trunnions into the inner ends of the clevises and the upper guide surfaces on the trunnions function in a slidable fulcrum capacity when the header is being raised to insure rearward movement of the trunnions into the inner ends of the openings in the clevises which comprise bearings that pivotally support the trunnions.

Still another object of the invention is to restrict the length of the guide shoes on the legs of the hoisting yoke relative to the length of the guide surfaces of the trunnion so that after the trunnions have engaged the guide surfaces of the clevises, the guide shoes are disengaged by the guide means on the feeder housing, whereby said guide means and guide shoes do not impede the pivotal movement of the header with respect to the harvester during the use thereof, under which conditions the trunnions are mounted in full pivotal position within the inner ends of the clevises.

It is a still further object of the invention to provide supplemental bearing members for the outer ends of the clevises and locking means for said supplement bearing members, whereby said bearing members sustain forces tending to move the trunnions out of the clevises during operation of the harvester but said hoisting yoke and actuating means therefor being operable, when it is desired to disconnect the harvester from the crop header and feeder housing, to relieve the pressure of the trunnions upon the supplemental bearing members, whereby the same may be removed readily from the clevises after the locking means have disengaged said supplemental bearing members.

Still another object of the invention is to provide relatively simple lug means on the legs of the hoisting yoke to constitute portions of the seats for said seating brackets and thereby insure against disconnection of the forward end of the hoisting yoke from engagement with the feeder housing during the connection of the crop header and feeder housing to the forward end of the harvester, and to facilitate connection and disconnection thereof.

One further object of the invention is to provide bracing plates at the outer corners of the hoisting yoke, said plates having said brackets connected thereto for pivotal connection of one end of the actuating means for the hoisting yoke which comprise hydraulic cylinders.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 3 is a fragmentary plan view of the mechanism shown in FIG. 2 and in which the connecting mechanism is shown in full lines while a fragmentary portion of the header and feeder housing are illustrated in phantom.

DETAILED DESCRIPTION OF THE DRAWINGS

Figure 1:
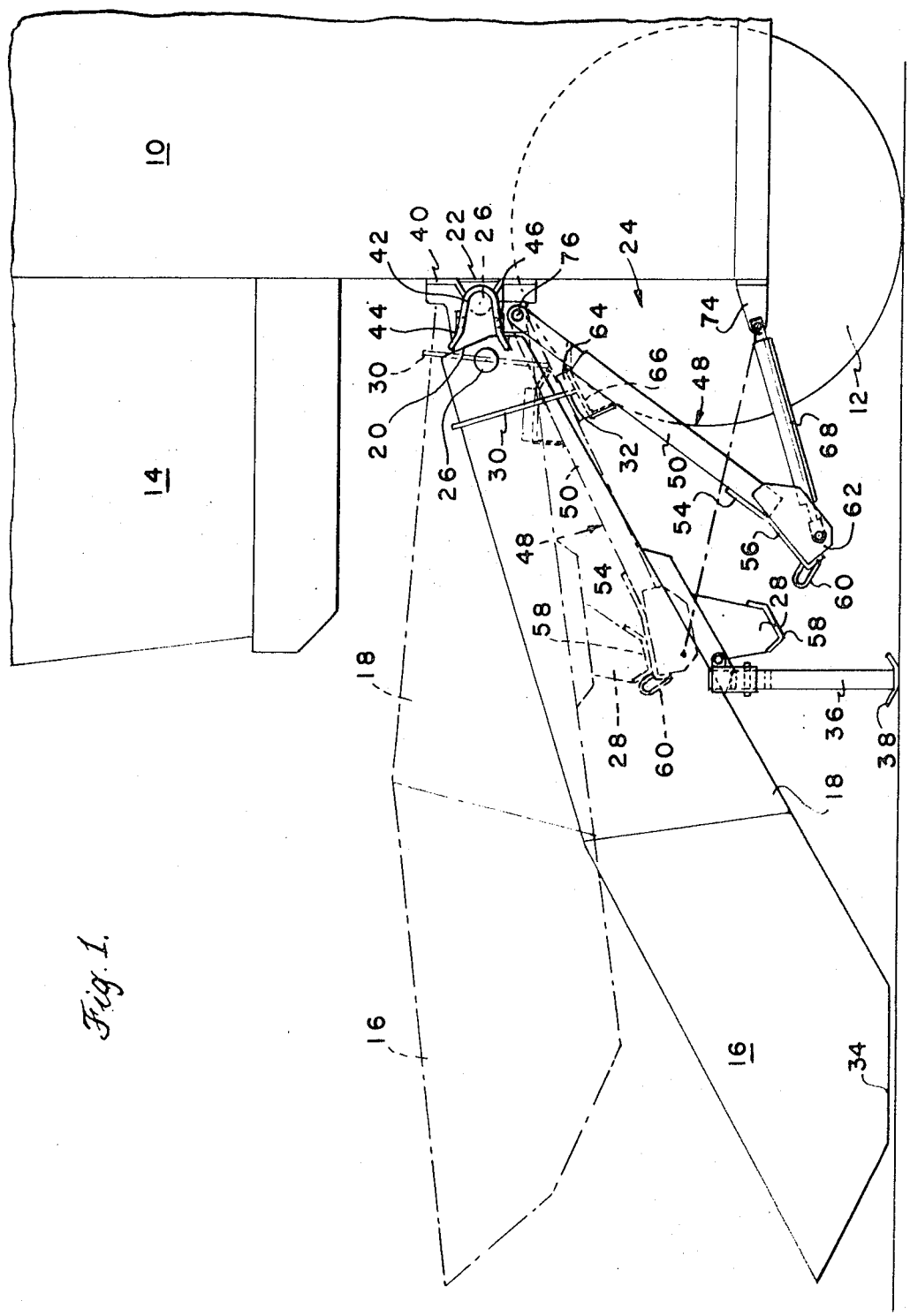
FIG. 1 is a fragmentary side elevation showing the forward end portion of a harvester to which connecting means are attached for connection of a crop header and feeder housing to the harvester, the inoperative positions of the connecting means, as well as the crop header and feeder housing being shown in full lines and an exemplary fully elevated position of the header and feeder housing being shown in phantom to illustrate the manner by which connection is established therebetween in accordance with the invention.

Referring to FIG. 1, a fragmentary forward portion of a harvester 10, such as a combine, which is partially supported in mobile condition by means of a pair of wheels 12, also has a fragmentarily illustrated portion 14 of an operating cab mounted upon the forward end of the harvester 10. FIG. 1 also shows, in outline manner, a crop header 16 and a feeder housing 18 of conventional type connected to the rearward end thereof. It will be understood that the feeder housing 18 contains mechanism, not shown, by which cut grain, corn and the like, which are severed from their root portions by the crop header 16, are delivered to the discharge end 20 of feeder housing 18, which is adjacent and in horizontal alignment with inlet opening 22 of the harvester 10.

Connector mechanism 24, by which the combination header 16 and feeder housing 18 are connected to the harvester 10, is carried by the forward end of the harvester and in order to adapt such connector mechanism for coaction with the header 16 and feeder housing 18, certain elements are attached to the feeder housing respectively on opposite sides thereof. These elements comprise a pair of trunnions 26 which, if desired, may be short sleeves supported by anti-friction bearings, a pair of seating brackets 28 which respectively depend from the lower surface of the feeder housing 18 adjacent opposite side edges thereof, and laterally extending guide flanges 30 which respectively project outwardly from opposite sidewalls of the housing 18 and the lower edges 32 of which comprise guide means, the purpose of which is described hereinafter.

In order to support the header 16 and feeder housing 18 in normal, inoperative position, the bottom surface 34 of the crop header rests upon the ground and vertically adjustable legs 36 having shoes 38 on the lower ends thereof engage the ground in a manner to support the header 16 and housing 18 in the angular position illustrated in exemplary manner in full lines in FIG. 1. When it is so arranged, it is in position for the connector mechanism 24 of harvester 10 to be connected therewith.

The elements of the connector mechanism 24 are relatively simple, sturdy and capable of easy operation with minimum power. Said mechanism comprises a pair of brackets 40 which include clevises 42 which open forwardly and are defined by substantially horizontally extending upper and lower guide surfaces 44 and 46, which also comprise throat surfaces of said clevises. The upper guide surface 44 of each clevis, in addition to guiding the trunnions 26 into full reception within the inner end of the clevises 42, also serves in a slidable fulcruming function, details of which are described hereinafter.

Connector mechanism 24 also includes a substantially U-shaped hoisting yoke 48, which, as best can be seen from FIG. 3, comprises a pair of legs 50 which are similar and parallel, and a transversely extending cross member 52. Somewhat triangularly shaped bracking plates 54 are disposed in the opposite corners of the hoisting yoke 48 and are secured by welding or otherwise to the legs 50 and cross-member 52 so as to render the yoke rigid and strong.

Bracing plates 54 also serve an additional function, namely, to provide a supporting surface 56 which is engaged by the lower ends of the seating brackets 28. Said brackets preferably have a transversely extending shoe 58 and the supporting surfaces 56 comprises portions of upwardly opening somewhat concave seats which otherwise are defined by lugs 60. Said lugs may actually comprise U-shaped strips of sturdy metal which is welded to the outer ends of the legs 50, as can be seen especially from FIG. 3. The upwardly opening seats, thus described, are substantially complementary at least to the major portions of the lower ends of the seating brackets 28, and especially the bottom and forward portions of the shoes 58 on said brackets 28, as is clearly shown in FIG. 2. As also shown in FIG. 2, the forward ends of legs 50 are provided with downwardly extending flanges 62 which are for purposes to be described.

Additional guide means are also mounted upon the legs 50 intermediately of the ends thereof for engagement with the guide means comprising the lower edges 32 of guide flanges 30. Such additional guide means are best shown in FIGS. 2 and 3, in which it will be seen that substantially triangularly shaped, vertical plates 64 are welded or otherwise firmly fixed to the upper surfaces of the legs 50. Extending laterally inward from the plates 64 are guide shoes 66 which are slidably engaged by the guide means 32 comprising the lower edges of flanges 30. The full operation of such guide means is described in detail hereinafter.

Connector mechanism 24 also includes actuating means comprising a pair of longitudinally extendable units 68 which, preferably, comprise piston and cylinder units of hydraulic type. The outer ends of the piston rods 70 are pivotally connected respectively at 72 to the flanges 62 on the outer end of the hoisting yoke 48, at opposite sides thereof. The opposite ends of the actuating unit 68 are pivotally connected to brackets 74 carried by the forward end of the harvester 10. The cylinders of the actuating means 68 are of conventional type and it will be understood that the same are connected to sources of fluid under pressure, by means of conduits, not shown, and controlled by appropriate valve means of conventional type, not shown, but preferably mounted so as to be conveniently located in the operating cab 14 of the harvester.

Figure 2:
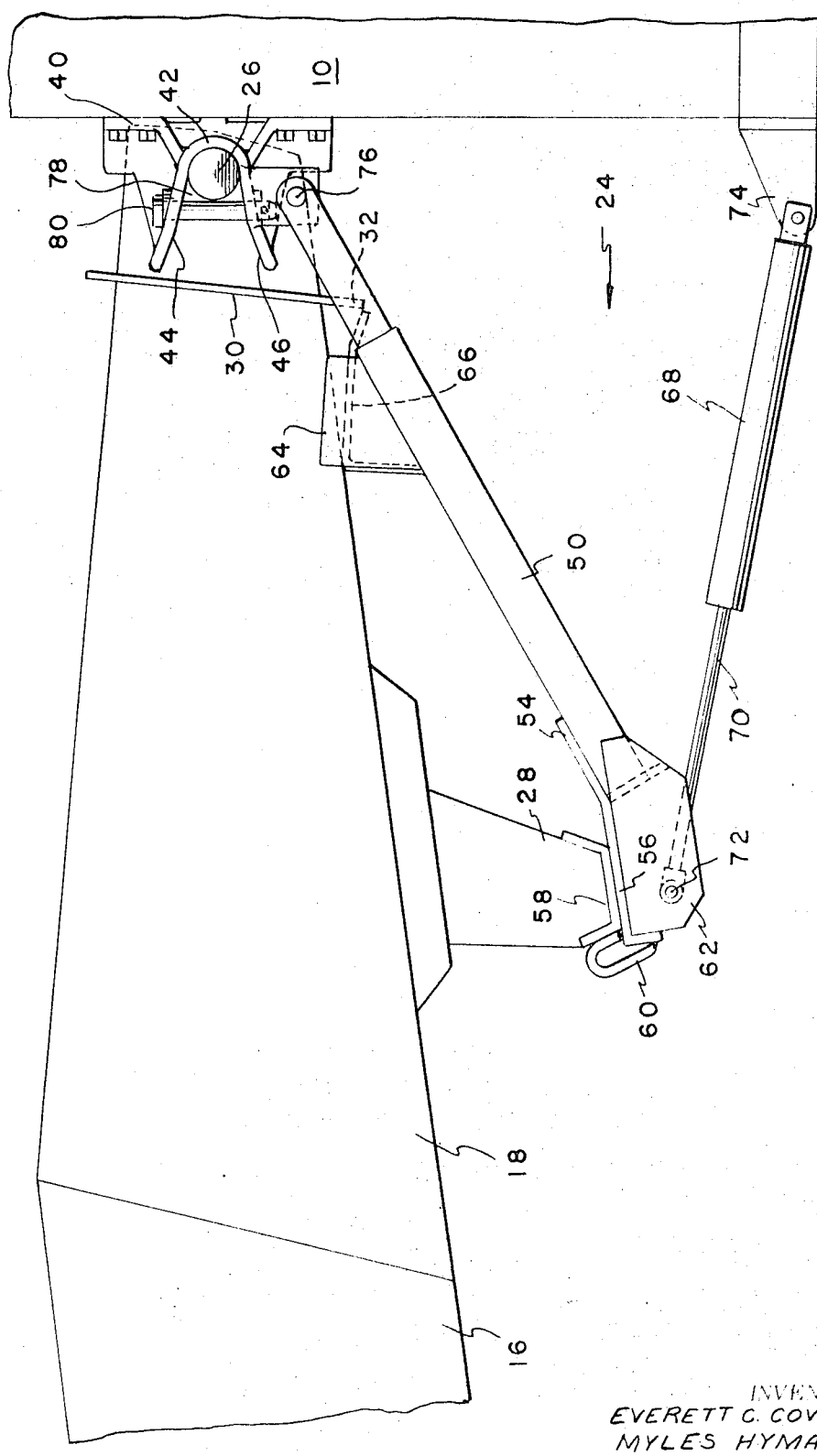
FIG. 2 is a fragmentary side elevation showing in full lines the phantom illustration in FIG. 1, but illustrated on a larger scale than employed in said FIG. 1.

The upper ends of the legs 50 of hoisting yoke 48 are pivotally connected by pins 76, shown best in FIG. 2, to appropriate bracket means depending from the lower member of each of the clevises 42. Pivots 76 are more or less directly below the operating axes of the trunnions 26 when disposed in operative position within the clevises 42. Accordingly, when the actuating units 68 are expanded, it will be seen that the outer end of the hoisting yoke 48 will be moved through an arc forwardly and upwardly for functions described hereinafter.

When the trunnions 26 have been disposed in home position in the inner ends of the openings of the clevises 42, as shown in FIG. 2, by means and operations described in detail hereinafter, a supplemental bearing member 78, which has a surface comprising a segment of a cylinder complementary to the trunnion 26, is mounted within each clevis so as to abut the trunnions. Locking pins 80 are disposed in receiving holes 82 in the clevises 42, as shown in FIG. 3, for purposes of securing the supplemental bearing member 78 in operative position with respect to the trunnions 26.

OPERATION OF THE MECHANISM

When the harvester 10 is to be connected to the header 16 and feeder housing 20, it is to be understood that the header and housing are supported in an inoperative position, such as illustrated in full lines in FIG. 1. An operator moves the forward end of the harvester 10, such as a combine, forwardly toward the discharge end 20 of the feeder housing 18, after initially aligning the harvester 10 in a transverse direction with respect to the axis of the header and housing 16 and 18. During such operation, the hoisting yoke 48 is in the lowered inoperative position shown in full lines in FIG. 1.

When in the foregoing position, it will be seen that the guide surfaces 32 of the guide flanges 30 on housing 18 will be engaged by the guide shoes 66 on the hoisting yoke 48 intermediately of the ends of said guide shoes. The trunnions 26 will be in the full line position thereof, shown in FIG. 1. It also will be noted that the guide shoes 66 preferably extend rearwardly and upwardly so as to assure that any necessary elevation of the trunnions 26 will take place in order to align the same correctly with the clevises 42, between the upper and lower guide surfaces 44 and 46 thereof.

Continued forward movement of the harvester 10 results in disposing the trunnions 26 within the openings of the clevises 42 and by the time the guide means 32 have traversed the full length of the guide shoes 66, the trunnions 26 will have been moved a substantial distance into the clevises 42 but not fully against the inner end of the bearing surfaces therein.

During such forward movement of the harvester 10, the upwardly opening seats comprising supporting surfaces 56 and shoes 58, which respectively are at opposite sides of the forward end of the hoisting yoke 48, will be disposed directly below the shoes 58 on the lower ends of seating brackets 28, whereupon the operator energizes the actuating means 68 equally and simultaneously at opposite sides of the harvester and thereby fully seats the lower ends of seating brackets 28 within the seats formed by supporting surfaces 56 and shoes 58 on the lower forward ends of hoisting yoke 48. Under such circumstances, the lugs 60, in particular, prevent any forward movement of the seating brackets 28 relative to the hoisting yoke 48. Also, because of the relative positions of the pivot pins 76 for said hoisting yoke with respect to the axes of the inner bearing portions of the clevises 42, continued expansion of the actuating means 68 performs two functions, (1) the forward end of header 16 continues to be elevated and (2) the trunnions 26 are moved rearwardly fully into home position within the inner ends of the bearing openings of the clevises 42.

When the foregoing has been accomplished, further delivery of power to the actuating means 68 for additional elevation of the header 16 is discontinued, the header then being substantially in the phantom position thereof shown in FIG. 1 with respect to harvester 10. This relationship also is shown in full lines in FIG. 2. Under such conditions, the trunnions 26 will be held in such operative bearing relationship within the clevises 42 in order to enable an operator to position the supplemental bearing members 78 in operative position within the clevises and mount the locking pins 80 in locking position to secure members 78 in such positions.

After the foregoing has been accomplished, the controls for the actuating means 68 are actuated suitably to permit lowering of the forward end of the header 16 to a desired operative position with respect to a crop to be harvested by said header for delivery through the feeder housing 18 to the harvester 10. Thus, the header 16 and feeder housing 18 are securely and operatively connected to the forward end of the harvester 10 so as to establish desired pivotal mounting for the header and housing upon the harvester, as controlled by the operator, through operation of the actuating means 68.

During such connection of the delivery end of the feeder housing 18 to the harvester 10, it will be seen from the drawings and the foregoing description that the trunnions 26 in no way engage any portion of the hoisting yoke 48, including the legs 50 thereof. This is due to the provision of laterally extending guide means 32 on the feeder housing 18 adjacent the delivery end thereof which slidably engage the guide shoes 66 which are directly carried by the arms 50 of hoisting yoke 48 and by such functions dispose the trunnions 26 at least in the outermost portion of the opening in each of the clevises 42. The upper portions of plates 64 also prevent any appreciable lateral movement of guide means 32 relative to guide shoes 66.

Further, the ability of the hoisting yoke 48 to move the trunnions 26 fully into home position within the innermost bearing end portions of the openings of clevises 42 is of particular advantage when it is desired to disconnect the header and feeder housing from the harvester 10. This is due to the fact that it is only necessary to apply power to the actuating means 68 sufficiently to fully elevate the hoisting yoke 48 in a manner to move the trunnions 26 fully to home position thereof within the bearing end portions of the clevises and thereby relieve pressure upon supplemental bearing members 78 so as to permit them readily to be removed when the locking pins 80 have been removed from the holes 82 therefor in the clevises 42.

It also will be seen that when the actuating means 68 are energized to move the hoisting yoke 48 into engagement with the seating brackets 28, continued elevation of the seats on yoke 48 will result in the trunnions 26 slidably engaging the upper guide surfaces 44 of the clevises 42 in a slidable fulcrumming action but in a manner which will in no way permit the escape of the trunnions 26 from the clevises 42 and the slidable movement of the trunnions 26 will continue under such circumstances until they reach the full home position in the inner ends of the openings of the clevises 42.

From the foregoing, it will be seen that the connector mechanism 24 is of a relatively simple nature and sturdy, which requires equally simple control mechanism to actuate the same, and accurate final positioning of the supporting trunnions within the clevises provided therefor is achieved quickly and accomplished by means of foolproof mechanism actuated by power means throughout, except for the final positioning of supplemental bearing members within the clevises to achieve final locking of the trunnions therein but such manual operation requiring no appreciable force. Also the operation is performed under safe conditions.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. An agricultural harvester having an inlet opening in the forward end thereof, in combination with connector mechanism on said forward end to receive a crop-gathering header and feeder housing having supporting trunnions projecting laterally from opposite sides of the discharge end of said feeder housing and seating brackets projecting downwardly from the lower edges of opposite sides of said feeder housing intermediately of the opposite ends thereof, said connector mechanism comprising:
    a. bearing clevises connected to similar locations at opposite sides of said inlet opening of said harvester and opening forwardly to guide movement of said trunnions into the inner ends of the clevis openings to support said trunnions therein for pivotal movement,
    b. a hoisting yoke comprising a pair of legs pivotally supported at one end by said harvester adjacent and below said bearing clevises and the opposite ends being rigidly connected by a cross-member, said yoke having generally concave seats thereon opening upwardly adjacent said opposite ends of said legs, said seats receiving the lower ends of said seating brackets,
    c. elongated actuating means connected at one end to the lower portion of said harvester and the opposite end projecting forwardly therefrom and being longitudinally movable in opposite directions and connected to said hoisting yoke to move said seats into engagement with said seating brackets and also raise said header to operative position, said header when raised by said actuating means to operative position also being operable to cause engagement of said seats on said yoke with said seating brackets to move said trunnions rearwardly and seat the same fully within said clevises, and
    d. locking means engageable with said clevises to lock said trunnions in operative position within said bearing clevises during operation of said harvester.

2. The harvester set forth in claim 1 further including
    e. laterally extending guide means on opposite sides of said feeder housing forwardly of said trunnions and adjacent the lower edges thereof, and
    f. guide shoes on said legs of said hoisting yoke spaced forwardly from said pivoted ends thereof and having guide surfaces spaced above said legs and operable to be slidably engaged by said guide means on said feeder housing and thereby guidably align said trunnions for reception by said bearing clevises when moving said harvester forwardly to effect connection of said header and feeder housing to said harvester by means of said connector mechanism, said guiding movement by said guide means maintaining said trunnions out of contact with said legs of said hoisting yoke.

3. The harvester set forth in claim 2 further characterized by said bearing clevises having upper and lower substantially horizontal surfaces substantially longer than the diameter of said trunnions, said upper surfaces being engaged by said trunnions in a slidable fulcrum-like manner when the outer end of said header is being elevated by said hoisting yoke to direct said trunnions to and seat the same within the inner ends of bearing spaces within said clevises.

4. The harvester set forth in claim 3 in which said guide shoes are of limited length and are disengaged by said guide means on said feeder housing when said trunnions engage said clevises prior to being fully seated therein, whereby pivotal movement of said header relative to said harvester is unimpeded by said guide shoes and guide means when said trunnions are seated fully within said bearing clevises.

5. The harvester according to claim 1 further including supplemental bearing members each having a bearing surface complementary to a segment of the surfaces of said trunnions and otherwise being complementary to portions of the throat surfaces of said clevises and positionable in said clevises against said trunnions and throat surfaces, and locking means engageable with said clevises and supplemental bearing members when said trunnions have been positioned fully within said clevises for support thereby to provide operable bearings for said trunnions, said trunnions being removable from said clevises by actuating said hoisting yoke to urge said trunnions firmly against the bearing surfaces at the inner ends of said clevis openings and thereby relieve pressure upon said supplemental bearing members and locking means to permit disconnection thereof from said clevises to open the throat of said clevises for removal of said trunnions therefrom when said hoisting yoke is lowered.

6. The harvester according to claim 1 in which said seats upon said yoke comprise lug means extending upwardly from said legs of said hoisting yoke adjacent the outer ends thereof and said seating brackets having surface portions on the lower ends thereof substantially complementary to the seat formed by said lug means and adjacent portions of said legs.

7. The harvester according to claim 6 further including bracing plates at the corners of said hoisting yoke to connect the ends of said cross-member thereof rigidly to the adjacent ends of said legs, said bracing plates having downwardly extending bracket means pivotally connected to the outer ends of said actuating means and said lug means being connected to and extending upward from said bracing plates, said seating brackets also abutting said bracing plates when seated within said seats of said hoisting yoke.

* * * * *